Figure 1:
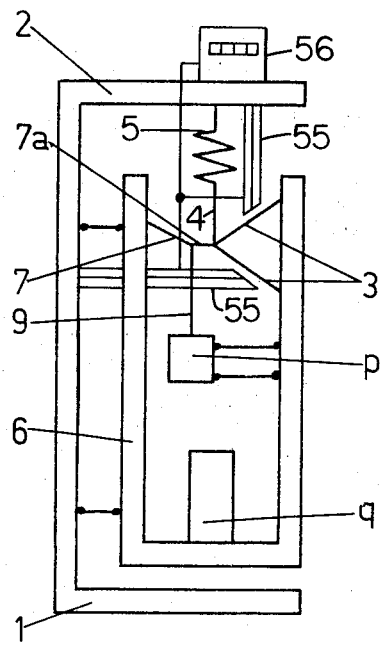

United States Patent
Gallo

[15] 3,692,128
[45] Sept. 19, 1972

[54] ELECTRICAL MASS METER
[72] Inventor: Mario Gallo, Zurich, Switzerland
[73] Assignee: Gallo Wirth & Co., Zurich, Switzerland
[22] Filed: Jan. 26, 1971
[21] Appl. No.: 109,973

Related U.S. Application Data
[63] Continuation of Ser. No. 758,319, Sept. 9, 1968, abandoned.

[30] Foreign Application Priority Data
Sept. 25, 1967 Switzerland.............13392/67

[52] U.S. Cl..................................177/210, 73/141 R
[51] Int. Cl. ..............................................G01g 3/14
[58] Field of Search........177/1, 210; 73/67.2, 141 R

[56] References Cited

UNITED STATES PATENTS

| | | | |
|---|---|---|---|
| 3,612,198 | 10/1971 | Gallo | 177/210 |
| 3,621,713 | 11/1971 | Wirth et al. | 177/210 X |
| 3,366,191 | 1/1968 | Reid et al. | 177/210 |
| 3,423,999 | 1/1969 | Wirth et al. | 73/141 R |

FOREIGN PATENTS OR APPLICATIONS

| | | | |
|---|---|---|---|
| 658,807 | 10/1951 | Great Britain | 177/210 |
| 916,110 | 1/1963 | Great Britain | 177/210 |

*Primary Examiner*—Richard B. Wilkinson
*Assistant Examiner*—George H. Miller, Jr.
*Attorney*—Stevens, Davis, Miller & Mosher

[57] ABSTRACT

An electrical mass meter having a frame with a baseplate, a weighing platform, a pre-tensioning mass linked to a force distributor which is in turn linked to the weighing platform, a plurality of transversely vibratable pre-tensioned strings having one end fixed to the weighing platform and the other end to the force distributor, and a transmitting element fixed to the frame and the strings, supporting thereby the weighing platform and transmitting to the strings an additional force proportional to a mass to be measured.

6 Claims, 6 Drawing Figures

3,692,128

INVENTOR.
MARIO GALLO

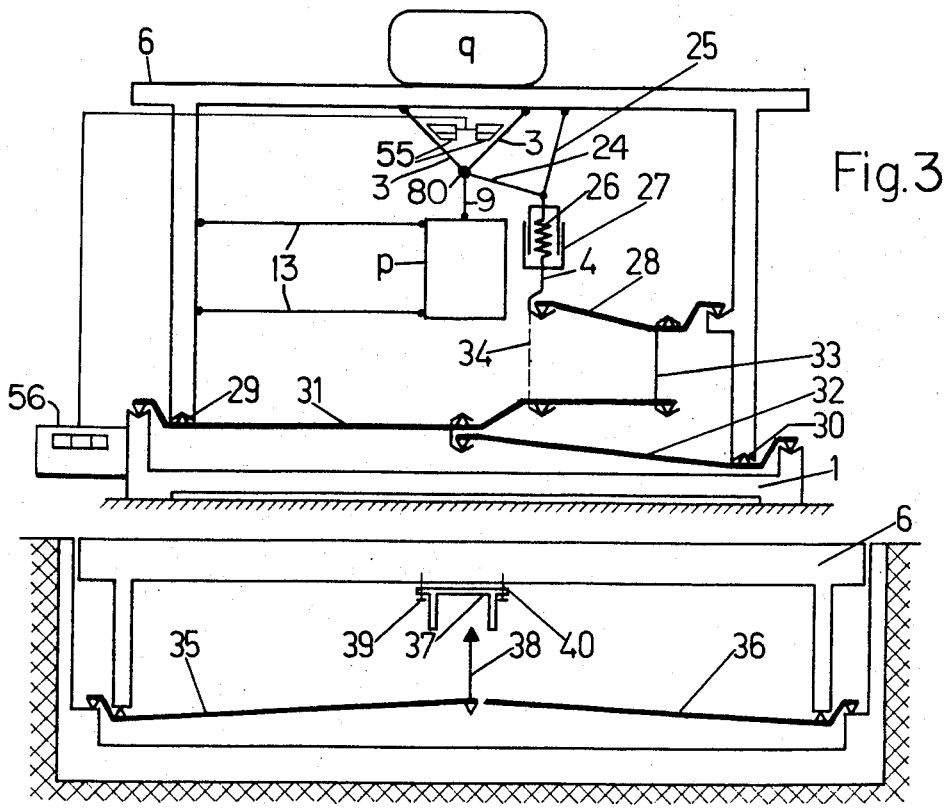
Fig. 3
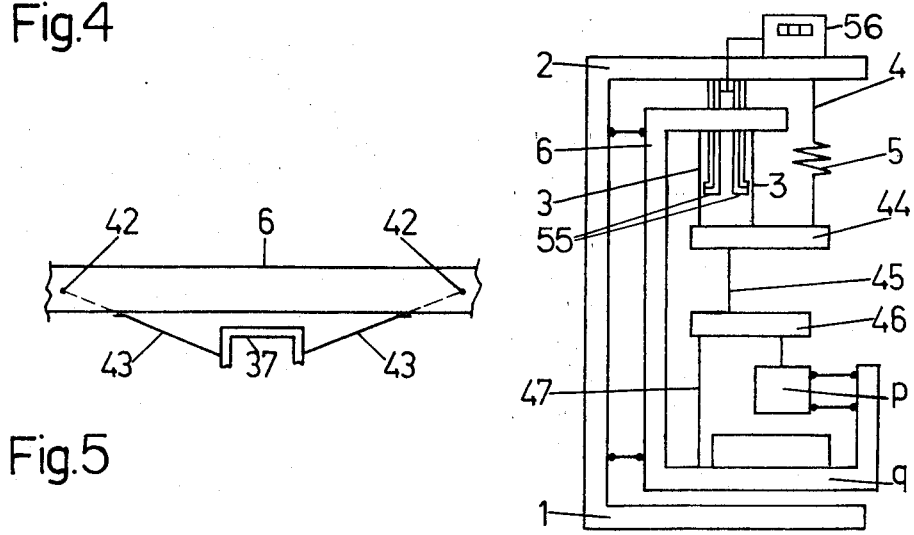
Fig. 4
Fig. 5
Fig. 6
INVENTOR.
MARIO GALLO

ELECTRICAL MASS METER

This application is a streamlined continuation of copending U.S. patent application Ser. No. 758,319, filed Sept. 9, 1968, now abandoned.

The invention relates to an electrical mass meter comprising a baseplate and a weighing platform, wherein the weight of the mass that is to be measured affects the mechanical tension of two electronically excited, transversely vibrating pre-tensioned strings, the resultant frequency variations being applied to a digital evaluation device for computation and display of the magnitude of the measured mass.

Mass meters of this kind are already known in the art and have been described for instance in U.S. Pat. No. 3,423,999. Means for exciting and sensing the oscillations of the strings are also known and have been described, for instance in U.S. Pat. No. 3,411,347. In these known mass meters both strings and the pre-tensioning mass are mechanically related to the baseplate. From a single point of the force-transmitting elements between the strings and the pre-tensioning mass, possibly in correlation with other connections to the baseplate, a single force-transmitting path (possibly through intervening levers) leads to the weighing platform. All the transmission means should be elastically relatively hard to impart to the pre-tensioning mass and its suspension on the one hand, and to the weighing platform bearing the load and its suspension on the other hand, both with respect to the baseplate, high and, if possible, not widely differing resonant frequencies. Technically this is practically impossible to achieve or too many complexities would be involved, so that the apparatus is sensitive to vibrations of the baseplate.

From the static point of view such devices are true mass meters, i.e. they provide results that are independent of the acceleration of gravity because the result they provide is based on the ratio of the weight of the measured mass and the weight of the pre-tensioning mass, said ratio — from the static point of view — being equal to the ratio of the magnitudes of the two masses themselves.

When exposed to vertical accelerations — for instance in a lift when stopping or starting or due to external vibrations — it is the dynamic weight of the two masses, that is to say the sum of their weights and their inertial forces — which acts on the two strings. The inertial force is proportional to the mass and its vertical acceleration. So long as the frequency of such vibrations — related to the oscillatory properties of the device — is low, the two masses will fairly accurately participate in the movements of the baseplate and the accelerations of the two masses will be the same. In such a case the ratio of the two dynamic weights, as measured by the evaluating instrument, will be equal to the ratio of the two masses. If Q and P are the dynamic weights of the mass q that is to be measured and of the pre-tensioning mass $p$, $g$ is the acceleration of gravity and $\ddot{z}$ the vertical vibratory acceleration affecting both masses, then:

$$\frac{Q}{P} = \frac{q(g+\ddot{z})}{p(g+\ddot{z})} = \frac{q}{p}$$

However, unavoidably the two masses $p$ and $q$ are elastically suspended and together with their suspensions they form two elastic oscillatory systems weakly coupled by the two strings.

If the frequency of the interfering vibrations is between the two resonant frequencies of the two oscillatory systems, then the mass having the lower resonant frequency will cease to follow the movements of the baseplate, but the other will. If the frequency of these vibrations coincides with one of the two resonant frequencies, then the acceleration of the corresponding mass will exceed that of the vibration of the foundation by the quality factor of its resonance.

When the frequencies of the interfering vibrations are within a range embracing the two resonant frequencies of the measuring device, the accelerations of the two masses $q$ and $p$, namely $\ddot{z}_q$ and $\ddot{z}_p$, will no more be equal to the acceleration $\ddot{z}$ of the foundation and they will also differ from each other. The result of the measurement will therefore be falsified:

$$\frac{Q}{P} = \frac{q(g+\ddot{z}_q)}{p(g+\ddot{z}_p)} \neq \frac{q}{p}$$

In the case of weighing machines for small loads their sensitivity to vibrations can be mitigated by the interposition of highly elastic and damping elements between the baseplate and the table or floor. However, for weighing major loads this expedient involves too high an expenditure in means or it meets with insuperable difficulties.

One object of the present invention is to provide a mass meter of the above-specified art which is rendered extremely insensitive to vertical vibrations of the foundation or baseplate without the need of additional protective measures.

As will be understood from the above description of the state of the art another object of the invention is to keep the accelerations of the masses $p$ and $q$ equal irrespectively of the frequency of any vibration of the foundation.

A further object of the invention is an electrical mass meter comprising a frame having a baseplate and a weighing platform, digital evaluation means mounted on said frame, a mass to be measured on the weighing platform, two electronically excited, transversely vibrating, pre-tensioned strings each having one end fixed to said weighing platform, a pre-tensioning mass, a first group of force-transmitting elements comprising said strings and connecting said pre-tensioning mass to the other ends of said strings, a second group of force-transmitting elements also comprising said strings and connecting said weighing platform to the baseplate, transmitting thereby to said other ends of said strings a force proportional to the mass to be measured, the action of this force on each of said strings being different of that exerted by the pre-tensioning mass, and means for applying to said digital evaluation device resultant frequency variations caused by the application of said forces to said strings for computation and display of the magnitude of the measured mass.

Figure 2:
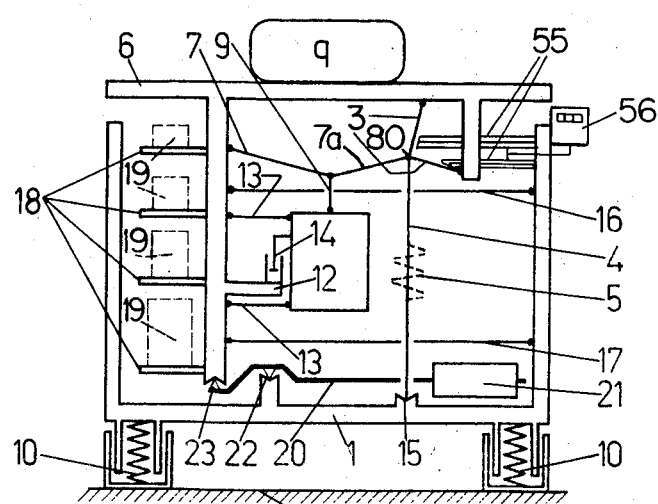

Embodiments of the invention are schemtically represented in the accompanying drawings in which FIG. 1 is a schematic representation of an arrangement according to an embodiment of the invention, FIG. 2 is an other embodiment of the invention for small loads without an interposed lever transmission, FIG. 3 is an embodiment of the invention for medium weight loads, FIG. 4 is an embodiment of the invention for major loads, for instance for weighing a vehicle, FIG. 5 is a variation thereof, and FIG. 6 is a schematic representation of yet another embodiment.

The drawings illustrating the different embodiments show the means for exciting and sensing the strings and the digital evaluation device generally by the elements denoted by reference numerals 55 and 56, respectively.

In the arrangement shown in FIG. 1 upon which all the following embodiments of the invention are based, strings 3 forming a V-shaped configuration and the mass $p$ are here fixed to the weighing platform 6 and the pre-tensioning mass $p$ tensions the strings 3 through force-transmitting elements 9, 7, 7a attached to the weighing platform 6. The suspension means 4 and the included relatively soft elastic element 5 here carry the weighing platform 6 bearing load $q$, as well as mass $p$, the strings 3 and the connecting wires 7, 7a and 9. The suspension includes the pre-tensioned strings 3, so that their tensions is affected by the magnitude of the load $q$. These elements are so designed that the natural frequency of vertical oscillations of the elastically suspended mass $p$ is higher than that of the elasticity suspended load $q$. It will be understood that the masses $p$ and $q$ will now behave in relatively the same way since element 5 can transmit only low frequencies from the baseplate 1 to the two masses $p$ and $q$ at which mass $p$ is capable of following the movements of load $q$. Whereas in the prior art arrangement the difference in the oscillatory characteristics of $q$ and $p$ increases as the interfering frequency becomes higher, element 5 in FIG. 1 has a useful effect inasmuch as it improves the oscillatory isolation of $q$ and $p$ from the baseplate with rising interfering frequencies.

FIG. 2 is an embodiment which is well adapted to the weighing of small loads. The weighing machine comprises a baseplate 1 which is mounted on a foundation 11 with the interposition of damping elements 10. Attached to the weighing platform 6 bearing the load $q$ are two transversely vibrating strings 3. Their ends are secured to a central body 80. A pre-tensioning mass $p$ is attached by links 13 to the weighing platform 6 in such a way that it can move only vertically and parallel to itself. Interposed between mass $p$ and a projection 12 from the weighing platform 6 is a damping element 14. Mass $p$ pre-tensions the strings 3 over transmission elements 9 and the central body 80 in such a way that the force applied to the strings 3 is stepped-up and exceeds the weight of the mass $p$ itself. The load from the weighing platform 6 to the baseplate 1 is transmitting through a single element, namely a compression rod 4 mounted between the central body 80 and a bearing 15 on the baseplate 1. This rod 4 comprises adjustable elastic means 5. Moreover, two parallel links 16 and 17 are provided to guide the weighing platform 6 parallel to itself perpendicularly to the baseplate 1. The weighing platform 6 is also provided with four brackets 18 upon which substitution weights 19 can be placed. A balancing lever 20 with a counterweight 21 comprises a knife edge 22 upon which the lever can rock on the baseplate 1. A knife edge 23 at the end of lever 20 supports the weighing platform 6.

These elements are so designed that the natural frequency of vertical vibrations of the system formed by the elastical suspension of mass $p$ is higher than that of the system formed by the suspension of load $q$.

FIG. 3 illustrates another embodiment which is suitable for medium-sized loads. Elements corresponding to those in previous embodiments are identified by the same reference. As will be understood from this drawing the pre-tensioning mass $p$ is attached directly by a single force-transmitting element 9 to the central body 80. Tension rod 4 is connected by transmission elements 24 and 25 to the central body 80 and to the weighing platform 6 respectively. The tension rod comprises a spring 26 and a damping member 27. The bottom end of the rod 4 is attached to one end of a lever 28 which at the other end rests on a bearing provided on the weighing platform 6. The weighing platform 6 itself rests at 29 and 30 on two coupled levers 31 and 32 which are rockably mounted on the baseplate 1. The free end of lever 31 is coupled by a shackle 33 to lever 28. This lever 28 is usually provided to establish a desired transformation ratio. If it should not be required it can be replaced by a shackle 34 indicated in dot-dash lines. In this embodiment the elements 3, 6, 80, 9, $p$ and $q$ are again so designed that the natural frequency of vertical vibrations of the suspension of mass $p$ is higher than that of the suspension of load $q$.

FIG. 4 is an embodiment for larger loads, for instance a weighing machine for vehicles. The weighing platform 6 which here forms a track for a vehicle is supported in conventional manner from load levers 35 and 36 which reduce the force (possibly in several stages not shown in the drawing) and transfer it to the center of the machine. Below the weighing platform is a casing 37 which in its interior contains the elements shown in FIG. 3, viz 3, 4, 80, 9, 13, 24, 25, 26, 27, $p$ (with or without a lever 28). A tension rod 38 is the only link establishing connection with the baseplate. It is attached either to the rod 4 or to the lever 28.

The casing 37 is bolted to the center of the vehicle platform by bolts 39, 40. If the vehicle platform is of considerable length flexural vibrations having nodes 42 along the length of the platform may be caused by vibrations transmitted through the ground. In such cases (FIG. 5) it is advantageous to attach the casing 37 to the platform by rods 43 which are pivotably linked to the platform near the locations of the nodes 42. The casing 37 and its contents will then not be exposed to the flexural oscillations of the platform 6. The ratio of the natural frequencies between the above-defined oscillatory systems should be chosen as in the other embodiments.

FIG. 6 is a schematic representation of yet another embodiment in which the distribution of the weight of the masses p and q between the two parallel strings 3 is achieved by means of a lever 44. The mass $p$ is suspended from another lever 46 which is coupled by a coupling element 45 to the lever 44. This lever 46 is connected by a tension member 47 to the weighing platform 6. The arrangement is so designed that the pre-tension of the strings 3 preferably exceeds the weight of the mass $p$. The weighing platform 6, which is guided in the parallel to itself by links, is connected to the support 2 of the baseplate 1 exclusively by the suspension 4 containing the elastic element 5. Again the natural frequency of the system formed by the suspension of mass $p$ exceeds that of the system formed by the suspension of load $q$.

What is claimed is:

1. An electrical mass meter comprising a frame having a baseplate, a weighing platform, a force transmitter linked to said weighing platform, a pre-tensioning mass, means connecting said pre-tensioning mass to said force transmitter, two transversely vibrating pre-tensioned strings, each having one end individually connected to said weighing platform and the other end connected to said force transmitter, means electronically vibrating said strings, means sensing the vibrations of said strings, said force transmitter including a transmitting element having one end connected to said frame and the other end connected to said other ends of said strings supporting thereby said weighing platform and transmitting to said other ends of said strings an additional force proportional to a mass to be measured, and means evaluating and displaying said vibrations in terms of said mass to be measured.

2. A mass meter according to claim 1 wherein the natural frequency of vibrations of the system comprising said pre-tensioning mass and said link are higher than that of the system comprising said weighing platform, said mass to be measured, said force transmitter and said strings.

3. A mass meter according to claim 2 further comprising a central body, said other ends of said strings and said link being jointly connected to said central body, said strings forming thereby a V-shaped configuration.

4. A mass meter according to claim 2 wherein said force transmitter comprises a lever to which said other ends of said strings are separately connected, said strings being generally parallel to each other.

5. A mass meter according to claim 2 wherein said force transmitter acts as a force multiplier when transmitting the pre-tensioning mass and the mass to be weighed.

6. An electrical mass meter comprising: a frame having a baseplate; a weighing platform; force-transmitting means linked to said weighing platform; a pre-tensioning mass; means linking said pre-tensioning mass to said force-transmitting means; a plurality of transversely vibratable pre-tensioned strings, each of said strings having one end individually connected to said weighing platform, the other ends thereof being connected to said force-transmitting means; means electronically vibrating said strings; means sensing the vibrations of said strings; said force-transmitting means including a transmitting element having one end connected to said frame and the other end connected to said other ends of said strings, supporting thereby said weighing platform and transmitting to said other ends of said strings an additional force proportional to a mass to be measured; and means evaluating and displaying said vibrations in terms of a mass to be measured.

* * * * *